US009760620B2

(12) United States Patent
Nachnani et al.

(10) Patent No.: US 9,760,620 B2
(45) Date of Patent: Sep. 12, 2017

(54) CONFIDENTLY ADDING SNIPPETS OF SEARCH RESULTS TO CLUSTERS OF OBJECTS

(71) Applicant: salesforce.com, inc., San Francisco, CA (US)

(72) Inventors: Pawan Nachnani, Union City, CA (US); Arun Kumar Jagota, Sunnyvale, CA (US)

(73) Assignee: salesforce.com, inc., San Francisco, CA (US)

( * ) Notice: Subject to any disclaimer, the term of this patent is extended or adjusted under 35 U.S.C. 154(b) by 461 days.

(21) Appl. No.: 14/337,505

(22) Filed: Jul. 22, 2014

(65) Prior Publication Data

US 2015/0032738 A1    Jan. 29, 2015

Related U.S. Application Data

(60) Provisional application No. 61/857,325, filed on Jul. 23, 2013, provisional application No. 61/862,873, filed on Aug. 6, 2013.

(51) Int. Cl.
G06F 17/30 (2006.01)

(52) U.S. Cl.
CPC .. G06F 17/30598 (2013.01); G06F 17/30554 (2013.01); G06F 17/30705 (2013.01); G06F 17/30722 (2013.01)

(58) Field of Classification Search
CPC ......... G06F 17/30554; G06F 17/30598; G06F 17/30705; G06F 17/3061; G06F 17/30722
USPC ................ 707/689, 690, 692, 723, 737, 738
See application file for complete search history.

(56) References Cited

U.S. PATENT DOCUMENTS

| 5,504,890 A * | 4/1996 | Sanford ............ G06F 17/30554 |
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |

(Continued)

OTHER PUBLICATIONS

U.S. Appl. No. 13/998,890.

(Continued)

*Primary Examiner* — Vincent F Boccio
(74) *Attorney, Agent, or Firm* — Dergosits & Noah LLP; Todd A. Noah (57) ABSTRACT

Systems and methods are provided for matching snippets of search results to clusters of objects. A system adds a data snippet of a search result to a cluster of objects. The system calculates a confidence score for the add based on the recency, a job title, an email address, and/or a phone number associated with the data snippet. The system stores the add in the customer accessible database if the confidence score is sufficiently high for the add to be stored in the customer accessible database. The system generates a notice for review if the confidence score is not sufficiently high for the add to be stored in the customer accessible database.

20 Claims, 4 Drawing Sheets

(56) References Cited

U.S. PATENT DOCUMENTS

| | | |
|---|---|---|
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,968,348 B1 * | 11/2005 | Carone ............... G06Q 40/02 707/696 |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,495,384 B1 * | 7/2013 | DeLuccia ........... H04L 63/1433 713/189 |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,577,849 B2 * | 11/2013 | Yakout ............... G06F 17/30303 707/690 |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2012/0023107 A1 * | 1/2012 | Nachnani ........... G06F 17/30303 707/748 |
| 2012/0233137 A1 | 9/2012 | Jakobson et al. |
| 2012/0296879 A1 * | 11/2012 | Yakout ............... G06F 17/30303 707/691 |
| 2013/0218948 A1 | 8/2013 | Jakobson |
| 2013/0218949 A1 | 8/2013 | Jakobson |
| 2013/0218966 A1 | 8/2013 | Jakobson |

OTHER PUBLICATIONS

U.S. Appl. No. 13/987,075.
U.S. Appl. No. 13/987,074.
U.S. Appl. No. 13/998,065.
U.S. Appl. No. 13/986,744.
U.S. Appl. No. 13/986,251.

* cited by examiner

CONFIDENTLY ADDING SNIPPETS OF SEARCH RESULTS TO CLUSTERS OF OBJECTS

CLAIM OF PRIORITY

This application claims the benefit of U.S. Provisional Patent Application No. 61/857,325 entitled, SYSTEM AND METHOD FOR MATCHING SNIPPETS OF SEARCH RESULTS TO CLUSTERS OF OBJECTS, by Nachnani, et al., filed Jul. 23, 2013, and U.S. Provisional Patent Application No. 61/862,873 entitled SYSTEM AND METHOD FOR CONFIDENTLY MERGING SNIPPETS OF SEARCH RESULTS WITH CLUSTERS OF OBJECTS, by Nachnani, et al., filed Aug. 6, 2013, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Companies are often overwhelmed with customer data. Names, titles, billing addresses, shipping addresses, email addresses, phone numbers, household data, affiliated companies, and associated parties are examples of customer data fields. Managing customer data can become extremely complex and dynamic due to the many changes individual customers go through over time. Multiply all of these customer data fields by the millions of customer data records which a company may have in its data sources, and factor in how quickly and how often this customer data changes, and the result is that many companies have a significant data management challenge.

Some customer data providers attempt to address this challenge by using a crowd-sourced platform to build a contact database which is sourced and updated by sales and marketing professionals. However, the customer data provided by customer data providers often has a variety problems, such as invalid email addresses or invalid phone numbers, a contact record with incorrect information from a name spelled wrong to a bad address, incomplete or inaccurate records for company names, job titles, and phone numbers, non-current data, wrong company information or wrong contact data, duplicate contacts with inconsistent information, fields that are empty due to poor data capture techniques or contain other inaccurate information, completed fields that contain nonsense data such as "TBA" or "TBD," and outdated information, such as a contact that no longer works at the contact's former company. Customer data providers may have these problems because community update models treat every add request or update request as an absolute fact, which can potentially lead to bad updates, such as incorrectly inactivating high-profile executives or fraudulently adding bogus contacts. While some issues may be alleviated by adding carrot-and-stick safeguards such as penalties for bad updates, rewards for good updates, and reputation-based updates, only a few ill-intentioned users can undermine the quality of customer data. Furthermore, the potential for bad data still exists when millions of records enter a customer data provider system from other sources, such that users or partners may end up adding bad data unknowingly from outdated lists and databases.

BRIEF SUMMARY

In accordance with embodiments, there are provided systems and methods for matching and confidently adding snippets of search results to clusters of objects. Information is searched based on objects in a cluster of objects. A data snippet may be extracted from the search results. The data snippet may be added to the cluster of objects if the data snippet includes data that matches at least one of the objects in the cluster of objects. A confidence score is calculated for adding the data snippet to the cluster of objects based on the recency, a job title, an email address, and/or a phone number associated with the data snippet. The data snippet is added to the cluster of objects in a customer accessible database if the confidence score is sufficiently high, and a notice for review is generated if the confidence score is not sufficiently high.

For example, a database system searches a business database for information about a business contact stored in a contact database, wherein the contact database includes objects stored in a cluster of objects that correspond to a given name "Gregory," a family name "Jones," a company "International Business Machines," a title "V.P for sales," a location "New York City," and an email address for a specific business contact. The database system extracts data that includes a given name "Greg," a family name "Jones," a company "IBM," and a mobile phone number from the information in one of the search results. The database system determines whether the data snippet extracted from the information in the search results includes data that matches any of the objects stored in the cluster of objects in the contact database corresponding to the business contact named Gregory Jones. The database system adds the extracted data snippet, including the mobile phone number, to the objects stored in the cluster of objects in the customer accessible database that correspond to the business contact named Gregory Jones because the calculated confidence score is sufficiently high since both the data snippet and the objects in the cluster of objects include the uncommon family name "Jones." In this example, a sales person planning on contacting Greg Jones at IBM now has Jones's mobile phone number that the sales person did not have previously.

The database system builds, manages and sustains a high-quality person data object by bringing in data from multiple sources, normalizing, enriching, matching, and merging data to provide a "golden record," or a best version of the data, for a person and the person's various business profile attributes. The database system leverages free web data sources such as news feeds, blogs and search results to mine attributes such as titles, social handles, etc., to further improve the quality of contact, company, and location data objects, and uses this additional data to build, validate and enrich person profiles.

While one or more implementations and techniques are described with reference to an embodiment in which matching and confidently adding snippets of search results to clusters of objects is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are provided for matching and confidently adding snippets of search results to clusters of objects. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system. Next, mechanisms and methods for matching and confidently adding snippets of search results to clusters of objects will be described with reference to example embodiments. The following detailed description will first describe a method for matching and confidently adding snippets of search results to clusters of objects. Next, a block diagram of an example system for matching and confidently adding snippets of search results to clusters of objects is described.

A lot of customer data makes up a database of contact records. The primary source for this customer data could be a website where users add and update business card information by adding or updating contact information one record at a time through a web form or by uploading comma seperated value files that contain contact information. Users may also ocassionally submit bounce email reports that contain error codes for invalid emails that they receive from their mail providers as part of their email marketing campaigns. A database system can receive and process millions of data records to provide new or updated data to customers in a timely manner. The database system cleans the data from the record, normalizes the data into a standard set of values that might be used for matching, enriches the data, and attempts to match the data with previously stored data to create a "golden record" for a person identified by the incoming data and/or previously stored data. False matches can result in the loss of good data and missed matches may reduce the value of previously stored data. The matching process also helps in identifying duplicates and decreases the possibilities that duplicate records are created for the same person. After the matching process returns a suitable list of matching person candidates, the database system adds the incoming data to a cluster of data objects that contains data objects that matches data objects for the person identified by the incoming data or creates a new cluster of data objects for the person if the database system does not already include any cluster of data objects that match data objects for the person identified by the incoming data. Then the database system determines whether to store the added data in a customer accessible database.

A significant majority of bad and erroneous operations may be prevented, thereby resulting in much higher quality of customer data, if a database system treats every add or update contribution as a claim, takes into account the reputation of the user/partner who makes the claim, the type of the claim, the date and time of the claim, and further validates this claim with data from the free web and other sources with additional levels of data stewardship. Claims from trusted users can be treated as sources of truth and valuable enough to overwrite almost all existing information. Claims from average members and the free web may be treated as good as any other information. The more consistent points identified will prevail, such as if three people evaluate some data as good and one person evaluates the same data as bad, the evaluations as good prevail. The database system weighs a claim on a graded scale and calculates various scores to generate a confidence score that is then used to determine the type of actions that are needed before the claim is fully processed and applied to generate a "golden record" for a person. The database system determines the quality of each and every individual attribute such as names, titles, emails, phones, social handles etc. Each and every attribute of data in the claim is scored and weighed against similar attributes from other claims and golden records in case they already exist. If the data in an attribute of a new claim is of better quality than an existing attribute and the confidence score of the new claim is above a certain threshold, the database system uses the incoming attribute in a data snippet to replace the existing data for that attribute in the golden record. The attribute in the data snippet is linked to a person record, where data from multiple contacts is combined to create/update work profiles for the person record, allowing tracking of the lifecycle and work profile of contacts. If the attribute in the data snippet is conflicting or additional details are needed, the database system generates an additional task/alert to data stewards for additional review based on the importance of the data record and the attribute in question. If the attribute in the data snippet is of poor quality, then the database system rejects the claim and the state of the attribute and golden record remains unaffected. If there is not enough information to make a decision, there is not enough authority to change the state, or no new information is detected, then no decision is made, re-affirming the current state of the data.

Figure 1:
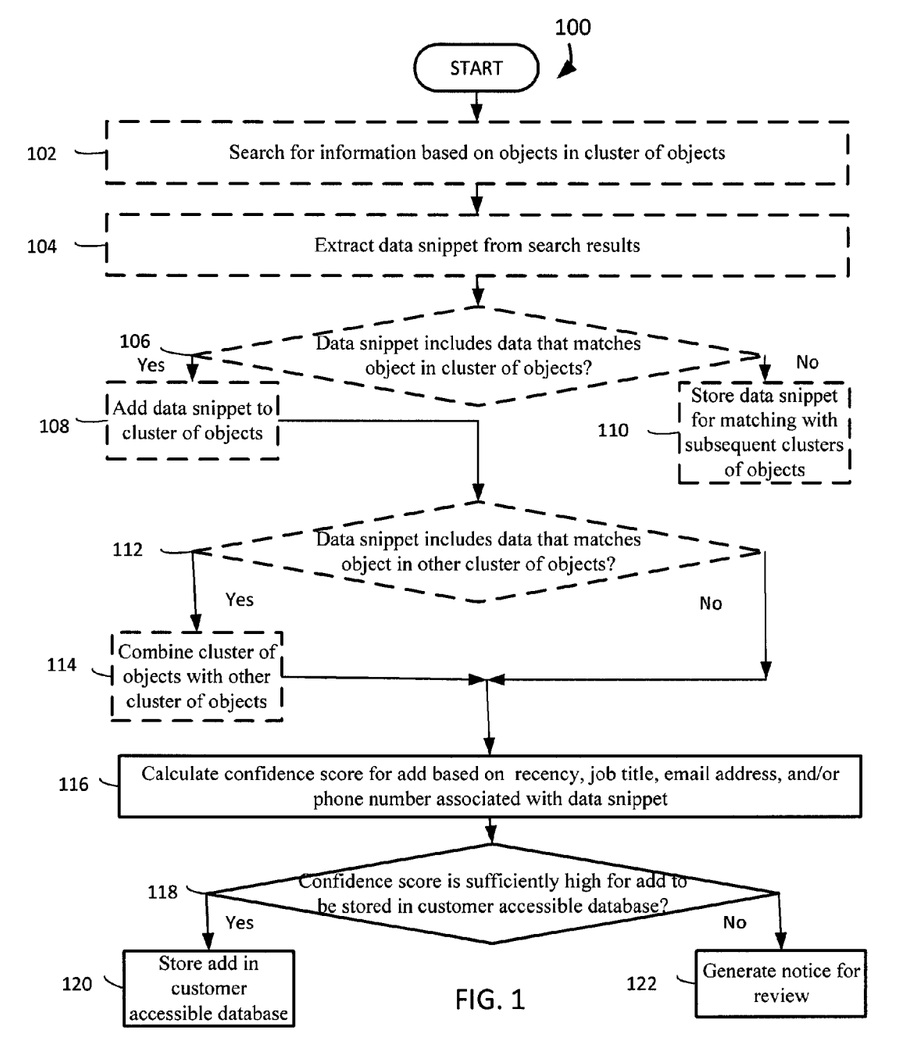
FIG. 1 is an operational flow diagram illustrating a high level overview of a method for matching and confidently adding snippets of search results to clusters of objects in an embodiment.

FIG. 1 is an operational flow diagram illustrating a high level overview of a method 100 for matching and confidently adding snippets of search results to clusters of objects. As shown in FIG. 1, a database system may match and confidently add snippets of search results to clusters of objects.

A database system optionally searches information based on objects in a cluster of objects, block 102. For example and without limitation, this can include the database system searching a business database for information about a business contact stored in a contact database, wherein the contact database includes objects stored in a cluster of objects that correspond to a given name "Gregory," a family name "Jones," a company "International Business Machines," a title "V.P for sales," a location "New York City, and an email address for a specific business contact. After receiving search results based on objects in a cluster of objects, the database system optionally extracts a data snippet from the search results, block 104. By way of example and without limitation, this can include the database system extracting data that includes a given name "Greg," a family name "Jones," a company "IBM," and a mobile phone number from the information in one of the search results.

Having extracted the data snippet from the search results, the database system optionally determines whether the data snippet includes data that matches at least one of the objects in the cluster of objects, block 106. In embodiments, this can include the database system determining whether the data snippet extracted from the information in the search result includes data that matches any of the objects stored in the cluster of objects in the contact database corresponding to the business contact named Gregory Jones. Whether the data snippet includes data that matches at least one of the objects in the cluster of objects may include matching based on first name aliases and/or acronym expansion. For example, "Greg" is a given name alias that matches the given name "Gregory" and "IBM" is an acronym that can be expanded to match "International Business Machines." If the data snippet includes data that matches at least one of the objects in the cluster of objects, the method continues to block 108. If the data snippet does not include data that matches at least one of the objects in the cluster of objects, the method proceeds to block 110. If the data snippet includes data that matches at least one of the objects in the cluster of objects, the database system optionally adds the data snippet to the cluster of objects, block 108. For example and without limitation, this can include the database system adding the extracted data snippet, including the mobile phone number, to the objects stored in the cluster of objects in the contact database that correspond to the business contact named Gregory Jones because both the data snippet and the objects in the cluster of objects include the uncommon family name "Jones." Then the method 100 proceeds to block 112. If the data snippet does not include data that matches at least one of the objects in the cluster of objects, the database system optionally stores the data snippet for matching with subsequent clusters of objects, block 110. By way of example and without limitation, this can include the database system storing the data snippet for matching with subsequent clusters of objects if the data snippet does not include data that matches at least one of the objects in the cluster of objects, as the contact database may be later supplemented with an additional contact that includes an object which matches some of the data in the extracted data snippet. Then the method 100 either terminates or begins again at block 102.

Having determined that the data snippet includes data which matches objects in a cluster of objects, the database system can also determine whether the data snippet includes data that matches objects in another cluster of objects, block 112. In embodiments, this can include the database system determining that the extracted data snippet that includes "Greg," "Jones," and the mobile phone number also matches an object in another cluster of objects that includes "Greg," "Jones," and a company "Microsoft." If the data snippet includes data that matches at least one of the objects in another cluster of objects, the method continues to block 114. If the data snippet does not include data that matches at least one of the objects in another cluster of objects, the method proceeds to block 116. If the data snippet includes data that matches at least one object in the other cluster of objects, the database system may combine the cluster of objects with the other cluster of objects, block 114. For example and without limitation, this can include the database system combining the clusters of objects for the two business contacts named "Jones" whose objects include "International Business Machines" and "Microsoft." Such a combination of clusters of objects for business contact objects could be useful for a sales person planning on contacting Greg Jones at IBM if the sales person knows some business contacts who worked at Microsoft at the time when Greg Jones worked at Microsoft.

After adding a data snippet to a cluster of objects, the database system calculates a confidence score for adding the data snippet to the cluster of objects based on the recency, a job title, an email address, and/or a phone number associated with the data snippet, block 116. By way of example and without limitation, this can include the database system calculating a confidence score based on how recent the data objects from the search result were stored in the business database, with the today's date of storage equated with the highest recency score. In another example, the database system calculates a confidence score based on a job title from the search result, with hierarchically higher job titles equated with a higher title rank score, and with job titles known to be used by the business contact's claimed company equated with a higher title quality score. In yet another example, the database system calculates a confidence score based on an email address from the search result, with the email score based on how well the email address matches the pattern of other email addresses for business contacts for the business contact's claimed company and how well the email address matches the first name and the last name of the business contact. In a further example, the database system calculates a confidence score based on a phone number from the search result, where the phone number score is based on the consistency between the claimed phone number and the area code associated with the claimed geographic location for the business contact. The confidence score may be based on any weighted combination of the recency, the job title, the email address, and the phone number from the data snippet.

The database system determines whether a confidence score is sufficiently high for adding the data snippet to the cluster of objects stored in a customer accessible database, block 118. In embodiments, this can include the database system determining that a confidence score is sufficiently high for a new mobile phone number to be added to the cluster of data objects for Greg Jones in a customer accessible database. If a confidence score is sufficiently high for adding the data snippet to the cluster of objects stored in a customer accessible database, the method 100 continues to block 120. If a confidence score is not sufficiently high for adding the data snippet to the cluster of objects stored in a customer accessible database, the method 100 proceeds to block 122. If the confidence score is sufficiently high for adding the data snippet to the cluster of objects stored in the customer accessible database, the database system adds the data snippet to the cluster of objects stored in the customer accessible database, block 120. For example and without limitation, this can include the database system storing the new mobile phone number in the contact database that is accessible by a sales person planning on contacting Greg Jones, who now has Jones's mobile phone number that the salesman did not have previously. Then the method 100 either terminates or begins again at block 102. Although this example describes the database system using a confidence score to determine whether to add a data snippet to a cluster of objects in a customer accessible database, the database system may also use a confidence score to determine whether to combine the cluster of objects with the other cluster of objects, and use a confidence score to determine whether to combine the cluster of objects with the other cluster of objects in a customer accessible database. If the confidence score is not sufficiently high for adding the data snippet to the cluster of objects stored in the customer accessible database, the database system generates a notice for review, block 122. By way of example and without limitation, this can include the database system generating a notice for reviewing the adding of the data snippet to the cluster of objects because the mobile phone number in the search results is not associated with New York City, the claimed office location for Jones in the search results, and the title "VP" in the search results is too generic and does not match any titles known to be used by IBM, the claimed company for Jones in the search results. Then the method 100 either terminates or begins again at block 102. Accordingly, systems and methods are provided which enable a database system for matching and confidently adding snippets of search results to clusters of objects.

The method 100 may be repeated as desired. Although this disclosure describes the blocks 102-122 executing in a particular order, the blocks 102-122 may be executed in a different order. In other implementations, each of the blocks 102-122 may also be executed in combination with other blocks and/or some blocks may be divided into a different set of blocks.

Figure 2:
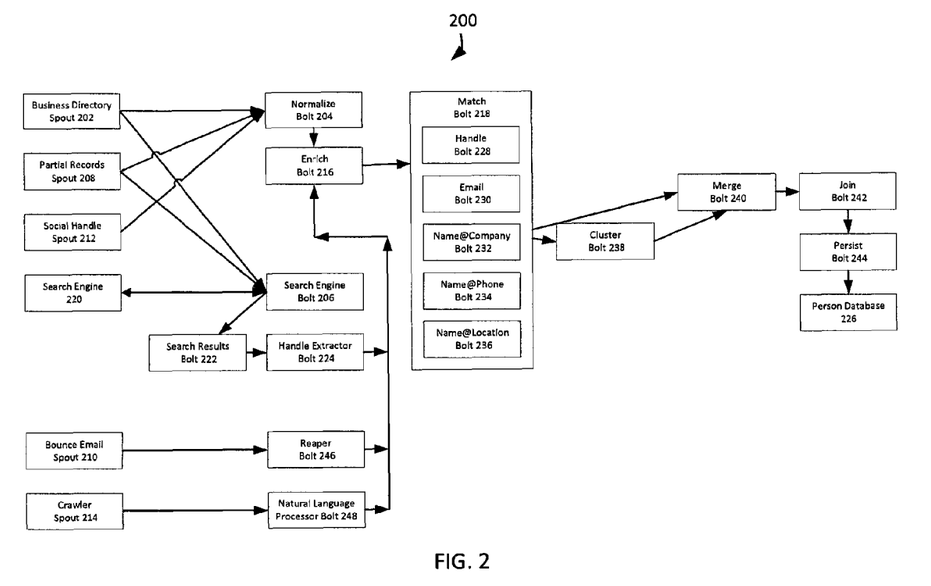
FIG. 2 is a block diagram of a system for matching and confidently adding snippets of search results to clusters of objects in an embodiment.

FIG. 2 illustrates a block diagram of an example system for matching and confidently adding snippets of search results to clusters of objects, under an embodiment. As shown in FIG. 2, the system 200 may illustrate a cloud computing environment in which data, applications, services, and other resources are stored and delivered through shared data-centers and appear as a single point of access for the users. The system 200 may also represent any other type of distributed computer network environment in which servers control the storage and distribution of resources and services for different client users.

One example of a system that can implement matching and confidently adding data snippets to clusters of objects is the popular open-source framework from Twitter® called Storm, which is a real time, open source data streaming framework that functions entirely in memory. Storm constructs a processing graph, called a "topology," that feeds data from input sources through processing nodes. The input data sources are called "spouts," and the processing nodes are called "bolts." The data model consists of tuples, which flow from spouts to the bolts, which execute user code. Besides simply being locations where data is transformed or accumulated, bolts may also join streams of data and branch streams of data. Storm is designed to be run on several machines to provided parallelism. Storm processes streams of tuples. A stream is defined to be an unlimited ordered sequence of tuples, and each tuple is a one dimensional array of values.

The system 200 acts as a central data processing hub, or clearing house, that brings in multiple data sources and free web data together to generate the "golden" record for core data assets around accounts and persons. The following describes the key components of the system 200 as part of a storm topology to implement the data processing pipeline. As part of the system initialization, before the Storm topology is activated to process any incoming claims, all the existing claims, reference data and golden person records are loaded into an in-memory key-value data store. The system 200 generates a set of specialized keys for each person record and claims that enable fast lookups for the purpose of matching and retrieval. Indices are created for each company, person and location object in the cache, and these indices are used for person matching, company matching and location matching. A spout is a source of data streams in a Storm topology. Generally spouts will read tuples from an external source and emit them into the topology.

The business directory spout 202 reads data from the business directory database and emits tuples, which are treated as claims, into the topology, such as contact added, contact updated, contact invalid phone, contact invalid email, and contact not at company. Each of these claim types has an associated contributor identifier that is the identity of the user who performed the action. The business directory spout 202 is an unbounded stream and keeps emitting data till there is no more data to be read. The tuples that are emitted out of the business directory spout 202 may be distributed randomly (shuffle grouping) to a normalize bolt 204 which is the first bolt in the pipeline. This data can also sent to a search engine bolt 206 which executes free web search queries and tries to find additional data around this contact, such as titles and social handles.

The partial records spout 208 provides partial records from disparate sources. The partial records spout 208 reads contact data from a partial records database where files that are uploaded by users on the website are stored in raw format before partial records processing. The key difference here is that unlike the business directory spout 202, the partial records spout 208 emits tuples based on partial data based on the data in the uploaded files. Also, the tuples that come out of the partial records spout 208 will often contain very poorly normalized data. Similar to the business directory spout 202, the tuples that are emitted out of the partial records spout 208 may be distributed randomly (shuffle grouping) to the normalize bolt 204 which is the first bolt in the pipeline. This data can also sent to the search engine bolt 206 which executes free web search queries and tries to find additional data around this contact, such as titles and social handles. Examples of claims emitted by the partial records spout 208 include contact added and contact added for new company.

The bounce email spout 210 reads bounce email error codes, which may be from comma separated value files that are uploaded by website administrators and website users. Examples of claims emitted by the bounce email spout include contact email and contact message. The bounce file message that the bounce email spout 210 receives for an email is typically unstructured text, such as records that are comma-separated with the email in the first column and the second column containing the bounce message as unstructured text. In order for the bounce email spout 210 to emit the values properly, an automatic column mapping algorithm may initially process the first few lines of the file. The algorithm does not need to rely on the names of the column headers, but rather the algorithm can tokenize the bounce file. The field separator may be determined from the file by tokenizing on each kind of separator and computing how consistent the number of tokens the algorithm creates for the entire file. After determining the field separator, the algorithm can determine which column contains the email and which column contains the message. The algorithm may split out the record, remove the email, and concatenate the rest of the record to create the contact message claim. The emitted contact message claim is typically an unstructured snippet of text.

The social handle spout 212 reads contact data and social handles from a social handle repository and submits claims such as contact social handle.

The crawler spout 214 emits contacts found on the web from crawling websites for their management pages. The crawler spout 214 may start with a number of seed companies that the system 200 currently has and use it as the starting point for crawling. Examples of claims emitted by the crawler spout 214 include contact added and contact updated.

Processing in a Storm topology is generally done in bolts. Bolts may do anything from filtering, functions, aggregations, joins, talking to databases, and more. The normalize bolt 204 processes all the tuples that come to it through a series of data normalization routines. The normalizer bolt 204 may standardize addresses, titles, phone numbers, and properly classify contact records by department and level. The following are some of the key normalizations. An address normalizer can include a list of abbreviations, such as E to East, W to West, Blvd to Boulevard; only allows letters, numbers, and special characters; and remove any space if there are any spaces around the special characters. A title normalizer may include a list of misspellings and abbreviations. A name normalizer can allow letters and special characters, not allow special characters at the beginning and the end of a name, capitalize the first letter and add a space after each name, capitalize the next letter if a name starts with "Mc," and capitalize all Roman numerals. A city normalizer may only allow letters and special characters, and only keep the last non-space special character if there are a sequence of special characters. A base normalizer can return the correct country normalizer based on the country abbreviation. A phone normalizer may normalize phone patterns based on each country having its own phone pattern. A zip normalizer can normalize zip code patterns based on each country having its own zip code pattern. A state normalizer may normalize states based on countries having its own state requirements, if there are any. Once the data is normalized, the normalizer bolt 204 can pass the data to the next stage in the pipeline, which is an enrich bolt 216.

The enrich bolt 216 uses external data services for email verification, for phone verification and social append services for social handles, and appends a set of meta-attributes to all the new contact claims that enter the pipeline. After enrichment, the tuple may contain additional metadata around emails, phones and social handles that is useful for matching and merging purposes. The enrich bolt 216 passes this data to the match bolt 218 that tries to match the incoming contact claims with other existing claims and facts in the system 200.

The match bolt 218 is based on the system 200 modeling a specific data model of a person object. For example, to allow matching on the probe (title=CEO, company=Google), the system 200 creates a suitable index (title@company or title_rank@company). A probe is a (partial) person record, such as some attribute:value pairs of a person with at least the person name present. For example (first_name=shabd, last_name=vaid, company=Responsys) should match the person Shabd Vaid because this name is uncommon and in the past he has worked at Responsys. The working data model of person object attributes may include: first name, last name, linkedin handle, twitter handle, other social handles, links to contact objects, work history, photos, education, and snippets, which are unstructured short pieces of text such as search result snippets, tweets, etc., and others containing person-identifying content.

A person object is composed of contact objects in a one to many relationship. That is, a person may have many contact objects, but a contact object belongs to only one person object. So if the probe matches a contact object, the system 200 can infer that the contact object matches the associated person object. If a probe does not match any contact object, yet it does match a person object, the probe contains some person-level attributes (such as social handles) which match a person object, or the probe contains some attributes of a person which cross contact boundaries. For example, the probe may be {person_name:"shabd vaid", company="iStorez", company="Responsys"}. This probe should match the Shabd Vaid person because his name is uncommon and he worked at both companies.

P denotes a person object and p.work_history.company_names denotes the names of companies p has worked at, p.work_history.cities denotes the set of all cities p has worked in, p.work_history.titles denotes the set of job titles that the person has held, and similar notations exist for work emails, work phones, work states, work countries, and social handles. The formats of the values of different types of social handles (linkedin, twitter, etc.) is quite different, so it may not be necessary to have a different index type for a different type of social handle because there is no risk of a collision.

A final check models the probability that a match is a chance event. Let M denote this match. Specifically, assume a universe of objects (here, persons) that has size n, and assume a uniform probability model on this universe, that is, all objects are equally likely. The system 200 can estimate the upper bound on the expected number E(M) of objects in the universe that have the properties of the match M, under the universe probability model. If this upper bound estimate is below a certain threshold (1 may be a sensible choice) the system 200 accepts this match, otherwise the system 200 rejects the match. One way to estimate a suitable upper bound on E(M) is to model the probabilities of various attribute:value pairs under the universe probability model, then assume the independence of attributes in the match and multiply out these probabilities, then finally multiply this by n. To formally describe this, let M={a:v| a is an attribute and v is its value}. For example, M={person_name: "john smith", company_name: "ibm"}. This means that the person name matched in M is John Smith, and the company_name matched in M is ibm. Now E(M)=n*product_{a:v in M}

P(a:v) (EUB 1. Modeling the probabilities of all attribute: value pairs in the universe is probably too complex, so the database system may begin by modeling the probabilities of certain key attributes and their value, drop all attributes other than these from M and still use (EUB 1. The result is still an estimate of the upper bound on E(M). For concreteness, suppose the system 200 has modeled the probability of person names in the universe, and of company names. For example M={person_name: "john smith", company_name: "ibm"} The estimated upper bound on E(M) is P(person_name: "john smith")*P(company_name: "ibm")*n~P(person_name: "john smith")*#contacts_in_company(company_name: "ibm")

The result-set size based estimate may not generalize as well as explicit modeling. For example, the P(person_name) explicit model which assumes independence of first and last names does not generalize well. An alternative to an explicit estimate is a result-set size based estimate. In this version, the system 200 runs the matcher to find all true positive matches. Here, 'true positive' may not include 'modeling chance matches'. If there are at least two distinct objects in the result set, the system 200 deems that the probe being matched is not matched uniquely. This approach has the benefit that the P(a:v) probabilities are not explicitly modeled. The result set will carry the information to judge whether a match is unique or not, even in complex cases. This approach has the limitation that it does not model the real world; only the current, actual universe of (golden) data objects. Another issue is that to implement this approach, the system 200 may need to do this computation after all the true positives have been generated. Furthermore, the system 200 can match within the result set to check whether there are indeed at least two different objects or not.

The search engine bolt 206 takes partial data (aka seed) and tries to find more publically available information via a search engine 220, such as Yahoo® Boss, because finding titles and social handles is useful. The data thus obtained is passed through a search results bolt 222 to extract vital information and enrich a data record to build a full person profile, such as by passing the data to a handle extractor bolt 224.

The search results bolt 222 uses search result snippets having attractive properties that suggest they be made first-class "objects" in a person database 226 and/or contact data model and matching engines. Snippets are consumed without running afoul of terms of use restrictions. For the most part, snippets contain information about a single entity—a person, company or contact. Snippets might be matched to a different type of suitable object, such as person, company, or contact. Some snippets contain information about multiple companies at which a person has worked, so snippets could be used to connect together multiple contacts of the same person Such a matching is of mostly unstructured text (the snippet) to structured data (a particular contact object): This matching does not require entity extraction from the snippet. This matching could be algorithmically relatively easy to do. Once a snippet has been matched to a suitable object with a sufficiently high confidence score, certain "nuggets" might be extracted from the snippet and the matching object enriched. For example, if the snippet contains a LinkedIn handle and the snippet matches a particular contact sufficiently well, this handle is then be attached to that contact. A snippet may tie together multiple contacts of the same person because the snippet contains the names of multiple companies at which the person has worked.

Contact initiated snippets generation and matching may work as follows. Start with a contact J. Let C denote the cluster of the person database 226 containing J. Generate a suitable query Q to the search engine 220 from J. For each snippet S in the top search results on Q, if S matches C with a sufficiently high confidence, add S to C, otherwise add S to a collection of unmatched snippets. If the person name in J is sufficiently uncommon, set Q to person-name(J), else set Q to person-name(J)+company-name(J). Two examples are Pawan Nachnani and John Smith ibm. Note that there is no data quality risk by setting a query too broad, such as a common person name, because the resulting snippets will be deeply matched with C. An overly broad query does not yield good recall because none of the snippets in its result set deeply match C. Recall may be less important than precision because if the system 200 makes up for low recall by pounding away at the search engine 220, so long as the system 200 is not constrained overly by search volume limits. Also, if the system 200 uses a mechanism to consume unmatched snippets, this mitigates the recall limitation a lot. C denotes the data of a single person. A snippet may contain data of this person spread across multiple contacts, which is why the database system matches S to C and not merely to J.

The process described in the previous section can produce a lot of snippets that remain unmatched. Accumulating these even over a short period of time may yield millions of snippets. Many of these snippets could contain useful information about contacts or persons that are not even yet in the database. In short, these snippets collectively have a lot of value. These snippets might be matched to contact or person objects and placed in the suitable cluster, then be available for merge. One major challenge in this regard is that of indexing a snippet for efficient matching. A person name may be a good index for snippets from person queries. The person name can be found from a snippet by light-weight entity recognition. Therefore, the match bolt 218 includes bolts such as a handle bolt 228, an email bolt 230, a name@company bolt 232, a name@phone bolt 234, and a name@location bolt 236 to match snippets to clusters of objects in the person database 226.

A cluster bolt 238 clusters all matching claims together into a common cluster. A merge bolt 240 merges all claims and existing contact records (partial and/or complete) from a cluster into a single composite record (the merged record) and computes a confidence score for the merged record. If the merged record is incomplete, the merge bolt 240 enriches the record when possible with information available in the cache. If the record is complete, the merge bolt 240 marks the record as canonicalized. At this point, the record is ready to be persisted in the person database 226, provided its confidence score is sufficiently high. The merge bolt 240 also updates the merge time of the incoming claim.

If r.day is today, then this score may have the value 1, and the score can reduce to 0 for a long time (many, many days) in the past. Score(r,rank)—based on r.title. c-level titles may get a score of 1 and the rank score can monotonically decay for lower rank titles. Score(r,title_quality)—High rank titles, e.g. Vice President, do not necessarily have high quality. Title_quality may score this separate dimension. A title might be deemed to have high quality if it has a known rank and has a known department and is not in an explicit list of poor titles. The quality may decrease depending on which (and how many) of the tests in the above sentence are violated. Score(r,domain)—might only be defined when r's company has been matched to company jc. Score(r,d)=#emails in domain d/#contacts in company jc. Score(r,pattern_domain)—How well (r.first_name,r.last_name,r.email) fits the email pattern of the domain of r.email Let p(r)=(r.first_name,r.last_name,r.email) be the pattern in r. For example, p=first.last for (john,doe,john.doe@xyz.com), p=flast for (john doe,jdoe@xyz.com) Score(r,pattern_domain)=#emails in domain of r.email having pattern p(r) divided by #emails in domain of r.email The intent is that updates algorithmically deemed risky may be logged for review by a data steward or community. Feedback from the review can be used to assess the accuracy of this scoring/detection mechanism, and tuning of it if it is deemed useful enough. An update is risky if a contact's last name is changed. A title change with more than one level increase in rank, such as software engineer to ceo, is also risky. A score version of this may make the risk score depend on the number of skipped levels. A title change which changes departments to another incompatible department, such as. vp sales to vp engineering is also risky. Updating or adding a C-level contact in a large company is risky, but easy to generalize in a scoring setting—the higher the rank of the contact and the larger the company size, the higher the risk score may be. Also, different update actions might possibly have differing risks, such as a title change is generally more risky than a last name change for a female. A fortune 1000 headquarters address change is also risky, but scoring may generalize this to important company combined with attribute-specific change score⇒ overall risk score)

The join bolt 242 takes all the merged claims from the merge bolt 240 and construct person objects. A person object may be a collection of major profiles, such as a person profile, a work profile, and a social profile. The data from each merged claim can update one or many attributes across all the three profiles of a person. In some cases, a merge claim may end up creating new profile objects as new claims become available. Each attribute in a profile ends up with a confidence score that may ultimately determine the level of "gold" for that particular profile object. While most of the attributes might be permanent, some of the attributes could be transient and need to re-computed over time due to privacy and legal reasons.

A persist bolt 244 may save all the resultant person records and the underlying claims to the person database 246 once all the processing is completed by the join bolt 242.

The bounce email processing bolt is a reaper bolt 246 that aggregates multiple facts with a current claim and comes up with a score and a disposition about that score. The reaper bolt 246 may determine if a fact is a duplicate. The fact disposition can determine if the computed score warrants a graveyard or ungraveyard of the underlying contact. The score of the current claim could be computed as follows: Take all claims and scored facts for the same email. For each fact, get the base score determined by the response category of the email. From the description from the bounce email spout 210, the contact message is typically unstructured data. The reaper bolt 246 may address this by using a trie-based approach to find tokens specified in a list of vendor dictionaries. Each vendor dictionary can specify the token with a classified response category. Response categories for email may be hard_error, heavy_error, soft_error, email_received, unknown. Once the score is computed, depending on the live contact and graveyard thresholds, the reaper bolt 246 may determine if the contact is to be made live or graveyarded. The reaper bolt 246 can automatically graveyard records from bounce reports and phone campaigns, or float these records to a community for task resolution.

The crawler spout 214 looks at free web (sites approved by a legal department for acceptable terms of service) and finds publically available information/claims. Since most of the open web sources of data are un-structured; the publicly available information typically requires sophisticated natural language processing techniques to extract meaningful information from it. Therefore, the crawler spout 214 feeds snippets of information to a natural language processing bolt 248, which applies natural language processing and machine learning techniques to extract relevant data/facts to emit the following types of claims: contact added, contact updated, contact graveyarded, and social handles.

A natural, human person may be represented as a graph of p:Person entities (nodes, or vertices) interconnected by links (edges). Each node can represent a different facet of the user (person). Each of these facets may be held in a separate (graph) container called a context. Each person entity node can be a set of attributes and values. These attributes might be simple literals (such as the user's first name) or they could be other entities (called complex attributes). These latter attributes might be links to other entity nodes. Typically each node in the person graph is located in its own context. The root node may lie in a special context (for each user) called the root context.

Once the golden records are curated, the system 200 delivers this data to the person database 226 that is customer accessible. This golden data may also be propagated back to the original source systems and other partner systems and help keep the data clean in their respective source databases.

The system 200 provides a complete 360 degrees feedback loop and reduces the chances that bad or fraudulent data may ever make it into customer's customer relationship management systems or any other system where a consolidated view of an account and person data is required. The core person and account repository also continues to grow over time as new pieces of data are found on the free web and other sources. Additional sources of data may also be on-boarded quickly into the system 200 by adding and configuring new spouts and corresponding bolts into the Storm topology. For example, a de-duplication bolt detects duplicates and automatically merges the duplicates or float suspected duplicates to a community for task resolution. In another example, a pinger bolt pings hypertext transfer protocol and simple mail transfer protocol domains for validity, automatically graveyarding when a domain is deemed invalid.

The system 200 may create indices for each company, person, and location object for matching purposes. Examples of person indices include record identifier, social handle, email direct phone number, company, city, zip, state, and country. Examples of location indices include record identifier, zip, city, and country. Examples of company indices include record identifier, domain, corporate phone, company prefix, stock ticker, company name and city, domain and city.

The system may build an inverted index from a snippet, and use the index to map words in the snippet to their positions. The positions for a given word could be in increasing order. An inverted index is illustrated in an example below.

Snippet=
Shabd Vaid|LinkedIn
www.linkedin.com/in/shabdvaid Cached
Shabd Vaid. Experience: Co-founder, Vice President Engineering & Operations, iStorez Inc.; Director of Engineering, Responsys; Senior Software Engineer, Newgen . . . .
Inverted Index: (only some key-value pairs shown).
shabd→<0,5>, vaid→<1,6>, vice→<9>, president→<10>, . . . .

The system 200 detects acronyms (if any) in the snippet, expands out these acronyms, tokenizes the expansion and incorporates these expansions into the inverted index, as illustrated in the example below.

IBM News room—Virginia M. Rometty—Chairman, President and . . . www-03.ibm.com/press/us/en/biography/10069.wss Cached IBM Press Room—Ginni Rometti Biography . . . Full biography. Ginni Rometty is Chairman, President and Chief Executive Officer of IBM.

Before acronymization, the inverted index contains the entry ibm⇒<0,i,j> where i and j denote the word positions of the 2nd and 3rd occurrence of IBM in the snippet. After recognizing the acronym ibm→"international business machines", the database system adds the entries international⇒ [i,0], business⇒ [i,1], and machines⇒ [i,2] to the inverted index. Acronym-expansion entries in a snippet's inverted index could be useful for matching titles or company names to the snippet.

The system 200 may represent an attribute:value pair as an ordered tree. The order can capture the order of the words in the value, and also in acronym expansions. The ordered tree may capture choices, which include aliases, and acronym expansions. Table 1 below shows various examples. Ordered trees can be depicted as nested arrays, and constructed via attribute-specific constructors. For example, person_name values are expanded to include first name aliases, and acronyms in company names and titles are detected and expanded, such as depicted in table 1. Ordered trees may have alternating levels of ordered ANDs and unordered ORs. For visual convenience, an AND-node is encapsulated in [ . . . ] and an OR-node in ( . . . ).

TABLE 1

Ordered Trees of attribute:value pairs:

| attribute | value | ordered tree |
| --- | --- | --- |
| person_name | (first_name = bob, last_name = smith) | [(bob, robert), smith] |
| title | chairman and ceo | [chairman, and, (ceo, [chief, executive, officer])] |
| company | ibm corp | [(ibm, [international, business, machines]), corp] |

As an example, [chairman, and, (ceo, [chief, executive, officer])] is read as "chairman AND (ceo OR (chief AND executive AND officer))." Representing the snippet as an inverted index combined with representing attribute:value pairs as ordered trees may lead to a very fast matching algorithm, as described below. The system 200 has attribute-specific matchers to match a value of a field to a snippet, which is unstructured text. The attribute-specific matchers could be instances of the following generic matcher.

match(attribute,value,snippet_inverted_index)
Build ordered tree, attribute_value_ordered_tree, from attribute:value pair.
Build hits, which populates a copy of the ordered tree with positions of words in the snippet that match (these replace the words in the original ordered tree). hits uses snippet_inverted_index and attribute_value_ordered_tree as arguments.
Analyze hits to score the match.
end match
Building hits could be attribute-independent. Analyzing hits might be done "on-the-fly" with building hits, however the algorithm is easier to understand when the two steps are separated out. Table 2 below shows some examples. A post-list in hits is represented by < . . . >.

TABLE 2 hits from attribute_value_ordered_tree and snippet_inverted_index:

| Row | attribute_value_ordered_tree | snippet_inverted_index | hits |
| --- | --- | --- | --- |
| 1 | [shabd, vaid] | {shabd → <0, 5>, vaid → <1, 6>, vice → <9>, president → <10>, . . . } | [<0, 5>, <1, 6>] |
| 2 | [vice, president] | {shabd → <0, 5>, vaid → <1, 6>, vice → <9>, president → <10>, . . . } | [<9>, <10>] |
| 3 | [(vp, [vice, president])] | {shabd → <0, 5>, vaid → <1, 6>, vice → <9>, president → <10>, . . . } | [(nil, [<9>, <10>])] |
| 4 | [(bob, robert), smith] | {robert → <8>, smith → <9>, . . . } | [(nil, <8>), <9>] |
| 5 | [chairman, and, (ceo, [chief, executive, officer])] | {chairman → <0>, and → <1>, chief → <2>, executive → <3>, officer → <4>, . . . , ceo → <8>} | [<0>, <1>, (<8>, [<2>, <3>, <4>])] |
| 6 | [(ibm, [international, business, machines]), corp] | {ibm → <0>} | [(<0>, [nil, nil, nil]), nil] |

Enumerating individual hits may be described based on the hits data structure in the last column of Table 2. Individual hits can reveal exactly what tokens in the query matched what positions in the snippet. Each hit could be individually scored. The overall score for the match of the attribute:value pair in the snippet might be defined as the aggregation of these individual scores. A hit could be a pair (tokens,positions), where tokens might be an array of tokens in attribute_value_ordered_tree and positions could be an array of positions in the snippet at which these tokens match, such as the examples below.

A one-level hits tree is simply an array of post-lists. In Table 2, hits of rows 1 and 2 form one-level trees. The system 200 may use a k-merge like algorithm to enumerate all the hits of such a tree to a snippet. This algorithm can "merge" k post-lists, as illustrated below. Below is an illustration on the hits [<0,5>, <1,6>]

[<0,5>, <1,6>]→([shabd,vaid],0 . . . 1)

[<0,5>, <1,6>]→([shabd,vaid],5 . . . 6)

The underlined entries depict the locations of the pointers in the various post-lists. In step 1, the pointers are at the start positions. Since 1 minus 0 equals 1, the system 200 generates a hit, 0 . . . 1, and advances both pointers. In step 2, since 6 minus 5 equals 1, the system 200 enumerates a hit, 5 . . . 6, and advances both pointers.

Enumerating hits of a multi-level tree may be done by suitably generalizing the k-merge operation. The generalization can be a little complex, and may be well described by building up inductively from different types of multi-level tree examples.

Example 1 is based on the hits of row 3 in Table 2: [(nil,[<9>, <10>])] and corresponds to a 3-level tree. The system 200 processes this example as follows.

[(nil,[<9>, <10>])]

(nil,[<9>, <10>])

[<9>, <10>]→>([vice,president],9 . . . 10)

First, the system 200 goes down one level since the top level is a singleton-AND. Next, the system 200 skips the nil. Finally, the system 200 produces the hit 9 . . . 10 from [<9>, <10>] and annotates it with [vice, president].

Example 2 is based on the hits of row 4 in Table 2:
[(nil,<8>),<9>]
[(nil,<8>),<u>9</u>>]
[(nil,<u>8</u>),<u>9</u>>]→>([robert,smith],8 . . . 9)

In step 1, the system 200 tries to 2-merge (nil,<8>) with <9>. Recognizing that the first argument is an OR, the system 200 goes down one level into the OR and effectively does the 2-merge of [<8>,<9>] in step 2.

Example 3 is based on the hits in row 5 of Table 2: [<0>, <1>, (<8>, [<2>, <3>, <4>])]
[<<u>0</u>>, <<u>1</u>>, (<8>, [<2>, <3>, <4>])]
[<<u>0</u>>, <<u>1</u>>, (<<u>8</u>>, [<<u>2</u>>, <3>, <<u>4</u>>])]→>([chairman,and,ceo],(0 . . . 1,8))
[<<u>0</u>>, <<u>1</u>>, (<8>, [<<u>2</u>>, <<u>3</u>>, <<u>4</u>>])]→>([chairman,and,chief, executive,officer],0 . . . 4)

In step 1, the system 200 recognizes that the need of a 3-merge at the top level. The system 200 places the pointers at the correct locations of the first two entries. The third entry is an OR, so the system 200 descends into the third entry and then places the pointer on the first entry in the first post-list in the OR choices. (This entry is 8.) The system 200 then outputs the hit (0 . . . 1,8) off to the scorer. Next, in step 3, the system 200 moves over to the second choice in this OR. This is itself an AND of three choices. So the system 200 needs a 3-merge, of [<2>, <3>, <4>]. This 3-merge produces the hit 2 . . . 4, which gets appended to 0 . . . 1 to yield 0 . . . 4.

Example 4: is based on the hits row 6 of Table 2:
[(<0>,[nil,nil,nil]),nil]
[(<<u>0</u>>, [nil,nil,nil]),nil]
[(<<u>0</u>>,[nil,nil,nil]),nil]→>([ibm,corp],[0,nil])

In step 1, the system 200 recognizes that the need of a 2-merge at the top level. The system 200 notices that the first entry is an OR, so the system 200 descends into the first entry and then places the pointer on the first entry in the first post-list in the OR choices. The system 200 notes that the second entry of the top-level AND is nil, so the system 200 outputs [0,nil] as one hit. Next, the system 200 advances the first pointer to the second choice in the OR (<<u>0</u>>,[nil,nil,nil]) and notices that it is [nil,nil,nil]. So the system 200 stops; such that no new hits are generated.

The hit scorer may take two arguments: argument_name and hit. Table 3 shows a number of examples explaining the scoring.

TABLE 3

| Scoring individual hits: | | |
|---|---|---|
| Attribute | Hit | Scoring Explanation |
| person name | ([shabd, vaid], 0 . . . 1) | Very high score since 1-0 = 1 |
| title | ([vice, president], 9 . . . 10) | Very high score since 10-9 = 1 |
| title | ([chairman, and, ceo], (0 . . . 1, 8)) | Moderate score since 8 is far from 0 . . . 1 |
| title | ([chairman, and, chief, executive, officer], 0 . . . 4) | Very high score because of 0 . . . 4 |
| company name | ([ibm, corp], [0, nil]) | High score because the unmatched corp is a company stop word |
| company name | ([jigsaw, data, corp], [5, nil, nil]) | Moderately high because the unmatched corp is a company stop word and the unmatched data is not the first word |
| company name | ([data, corp], [nil, 3]) | Low score because the unmatched data is first word in company name |

TABLE 3-continued

| Scoring individual hits: | | |
|---|---|---|
| Attribute | Hit | Scoring Explanation |
| person name | ([john, smith], [3, 9]) | Low score because the distance between the two matches, i.e. 9-3, is too high. |
| person name | ([john, smith], [3, 5]) | Moderately high score because the distance 5-3 is small (2) though not ideal (1). |
| title | ([director, of, engineering], [6, nil, 5]) | Moderately high score because |5-6| = 1 and title matches should be looser on word order. |

The system 200 brings together various algorithms, processes and techniques that are particularly suited for finding inaccurate data and piecing together rapidly changing pieces of data and claims to generate golden records at a massive scale. The system 200 provides a complete framework to efficiently evaluate data and to improve the completeness and accuracy of data. The system 200 provides a solid foundation for linking external data sources to core data assets in a reliable and scalable way that will enable customers to gain additional insights into their customers.

System Overview

Figure 3:
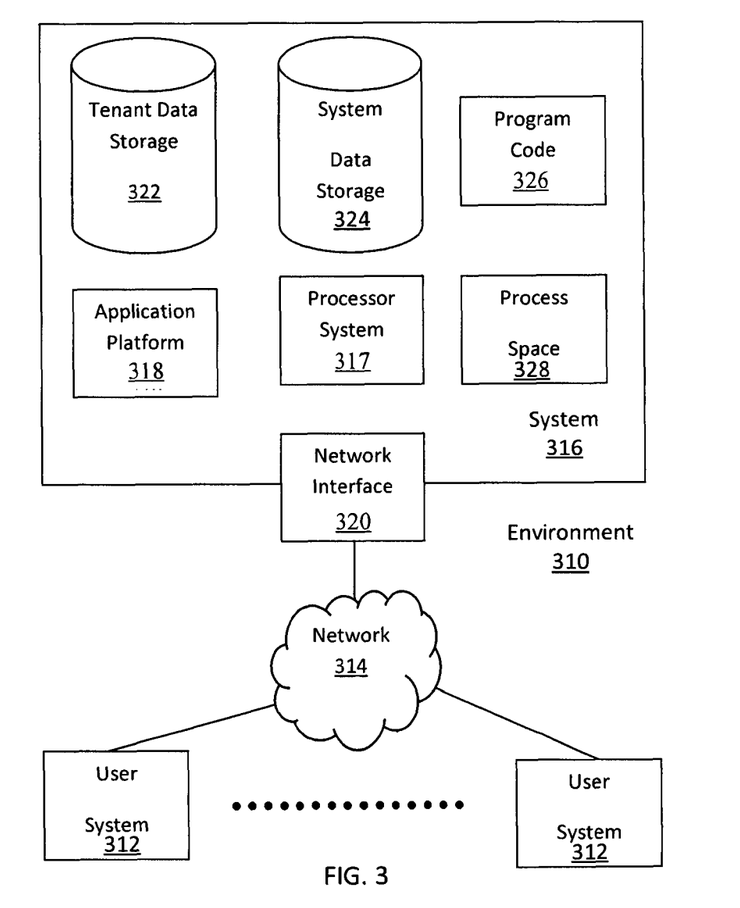
FIG. 3 illustrates a block diagram of an example of an environment wherein an on-demand database service might be used.

FIG. 3 illustrates a block diagram of an environment 310 wherein an on-demand database service might be used. The environment 310 may include user systems 312, a network 314, a system 316, a processor system 317, an application platform 318, a network interface 320, a tenant data storage 322, a system data storage 324, program code 326, and a process space 328. In other embodiments, the environment 310 may not have all of the components listed and/or may have other elements instead of, or in addition to, those listed above.

The environment 310 is an environment in which an on-demand database service exists. A user system 312 may be any machine or system that is used by a user to access a database user system. For example, any of the user systems 312 may be a handheld computing device, a mobile phone, a laptop computer, a work station, and/or a network of computing devices. As illustrated in FIG. 3 (and in more detail in FIG. 4) the user systems 312 might interact via the network 314 with an on-demand database service, which is the system 316.

An on-demand database service, such as the system 316, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, the "on-demand database service 316" and the "system 316" will be used interchangeably herein. A database image may include one or more database objects. A relational database management system (RDMS) or the equivalent may execute storage and retrieval of information against the database object(s). The application platform 318 may be a framework that allows the applications of the system 316 to run, such as the hardware and/or software, e.g., the operating system. In an embodiment, the on-demand database service 316 may include the application platform 318 which enables creation, managing and executing one or more applications developed by the provider of the on-demand database service, users accessing the on-demand database service via user systems 312, or third party application developers accessing the on-demand database service via the user systems 312.

The users of the user systems 312 may differ in their respective capacities, and the capacity of a particular user system 312 might be entirely determined by permissions (permission levels) for the current user. For example, where a salesperson is using a particular user system 312 to interact with the system 316, that user system 312 has the capacities allotted to that salesperson. However, while an administrator is using that user system 312 to interact with the system 316, that user system 312 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 314 is any network or combination of networks of devices that communicate with one another. For example, the network 314 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

The user systems 312 might communicate with the system 316 using TCP/IP and, at a higher network level, use other common Internet protocols to communicate, such as HTTP, FTP, AFS, WAP, etc. In an example where HTTP is used, the user systems 312 might include an HTTP client commonly referred to as a "browser" for sending and receiving HTTP messages to and from an HTTP server at the system 316. Such an HTTP server might be implemented as the sole network interface between the system 316 and the network 314, but other techniques might be used as well or instead. In some implementations, the interface between the system 316 and the network 314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, the system 316, shown in FIG. 3, implements a web-based customer relationship management (CRM) system. For example, in one embodiment, the system 316 includes application servers configured to implement and execute CRM software applications as well as provide related data, code, forms, webpages and other information to and from the user systems 312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, the system 316 implements applications other than, or in addition to, a CRM application. For example, the system 316 may provide tenant access to multiple hosted (standard and custom) applications, including a CRM application. User (or third party developer) applications, which may or may not include CRM, may be supported by the application platform 318, which manages creation, storage of the applications into one or more database objects and executing of the applications in a virtual machine in the process space of the system 316.

One arrangement for elements of the system 316 is shown in FIG. 3, including the network interface 320, the application platform 318, the tenant data storage 322 for tenant data 323, the system data storage 324 for system data 325 accessible to the system 316 and possibly multiple tenants, the program code 326 for implementing various functions of the system 316, and the process space 328 for executing MTS system processes and tenant-specific processes, such as running applications as part of an application hosting service. Additional processes that may execute on the system 316 include database indexing processes.

Several elements in the system shown in FIG. 3 include conventional, well-known elements that are explained only briefly here. For example, each of the user systems 312 could include a desktop personal computer, workstation, laptop, PDA, cell phone, or any wireless access protocol (WAP) enabled device or any other computing device capable of interfacing directly or indirectly to the Internet or other network connection. Each of the user systems 312 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of the user systems 312 to access, process and view information, pages and applications available to it from the system 316 over the network 314. Each of the user systems 312 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by the system 316 or other systems or servers. For example, the user interface device may be used to access data and applications hosted by the system 316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each of the user systems 312 and all of its components are operator configurable using applications, such as a browser, including computer code run using a central processing unit such as an Intel Pentium® processor or the like. Similarly, the system 316 (and additional instances of an MTS, where more than one is present) and all of their components might be operator configurable using application(s) including computer code to run using a central processing unit such as the processor system 317, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring the system 316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, the system 316 is configured to provide webpages, forms, applications, data and media content to the user (client) systems 312 to support the access by the user systems 312 as tenants of the system 316. As such, the system 316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 4:
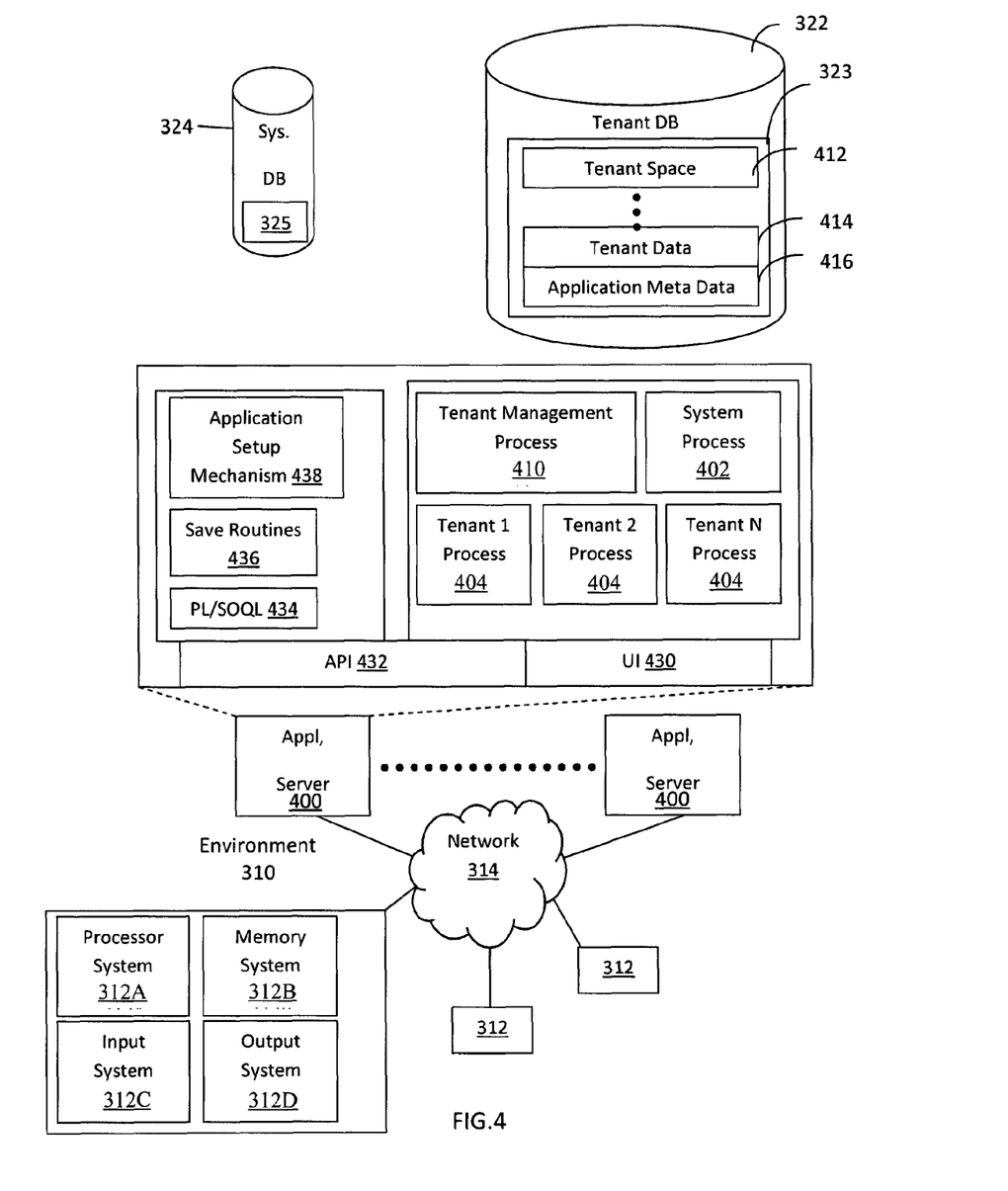
FIG. 4 illustrates a block diagram of an embodiment of elements of FIG. 3 and various possible interconnections between these elements.

FIG. 4 also illustrates the environment 310. However, in FIG. 4 elements of the system 316 and various interconnections in an embodiment are further illustrated. FIG. 4 shows that the each of the user systems 312 may include a processor system 312A, a memory system 312B, an input system 312C, and an output system 312D. FIG. 4 shows the network 314 and the system 316. FIG. 4 also shows that the system 316 may include the tenant data storage 322, the tenant data 323, the system data storage 324, the system data 325, a User Interface (UI) 430, an Application Program Interface (API) 432, a PL/SOQL 434, save routines 436, an application setup mechanism 438, applications servers $400_1$-$400_N$, a system process space 402, tenant process spaces 404, a tenant management process space 410, a tenant storage area 412, a user storage 414, and application metadata 416. In other embodiments, the environment 310 may not have the same elements as those listed above and/or may have other elements instead of, or in addition to, those listed above.

The user systems 312, the network 314, the system 316, the tenant data storage 322, and the system data storage 324 were discussed above in FIG. 3. Regarding the user systems 312, the processor system 312A may be any combination of one or more processors. The memory system 312B may be any combination of one or more memory devices, short term, and/or long term memory. The input system 312C may be any combination of input devices, such as one or more keyboards, mice, trackballs, scanners, cameras, and/or interfaces to networks. The output system 312D may be any combination of output devices, such as one or more monitors, printers, and/or interfaces to networks. As shown by FIG. 4, the system 316 may include the network interface 320 (of FIG. 3) implemented as a set of HTTP application servers 400, the application platform 318, the tenant data storage 322, and the system data storage 324. Also shown is the system process space 402, including individual tenant process spaces 404 and the tenant management process space 410. Each application server 400 may be configured to access tenant data storage 322 and the tenant data 323 therein, and the system data storage 324 and the system data 325 therein to serve requests of the user systems 312. The tenant data 323 might be divided into individual tenant storage areas 412, which can be either a physical arrangement and/or a logical arrangement of data. Within each tenant storage area 412, the user storage 414 and the application metadata 416 might be similarly allocated for each user. For example, a copy of a user's most recently used (MRU) items might be stored to the user storage 414. Similarly, a copy of MRU items for an entire organization that is a tenant might be stored to the tenant storage area 412. The UI 430 provides a user interface and the API 432 provides an application programmer interface to the system 316 resident processes to users and/or developers at the user systems 312. The tenant data and the system data may be stored in various databases, such as one or more Oracle™ databases.

The application platform 318 includes the application setup mechanism 438 that supports application developers' creation and management of applications, which may be saved as metadata into the tenant data storage 322 by the save routines 436 for execution by subscribers as one or more tenant process spaces 404 managed by the tenant management process 410 for example. Invocations to such applications may be coded using the PL/SOQL 34 that provides a programming language style interface extension to the API 432. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving the application metadata 416 for the subscriber making the invocation and executing the metadata as an application in a virtual machine.

Each application server 400 may be communicably coupled to database systems, e.g., having access to the system data 325 and the tenant data 323, via a different network connection. For example, one application server $400_1$ might be coupled via the network 314 (e.g., the Internet), another application server $400_{N-1}$ might be coupled via a direct network link, and another application server $400_N$ might be coupled by yet a different network connection. Transfer Control Protocol and Internet Protocol (TCP/IP) are typical protocols for communicating between application servers 400 and the database system. However, it will be apparent to one skilled in the art that other transport protocols may be used to optimize the system depending on the network interconnect used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 Big-IP load balancer) is communicably coupled between the application servers 400 and the user systems 312 to distribute requests to the application servers 400. In one embodiment, the load balancer uses a least connections algorithm to route user requests to the application servers 400. Other examples of load balancing algorithms, such as round robin and observed response time, also can be used. For example, in certain embodiments, three consecutive requests from the same user could hit three different application servers 400, and three requests from different users could hit the same application server 400. In this manner, the system 316 is multi-tenant, wherein the system 316 handles storage of, and access to, different objects, data and applications across disparate users and organizations.

As an example of storage, one tenant might be a company that employs a sales force where each salesperson uses the system 316 to manage their sales process. Thus, a user might maintain contact data, leads data, customer follow-up data, performance data, goals and progress data, etc., all applicable to that user's personal sales process (e.g., in the tenant data storage 322). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, the system 316 might also maintain system level data usable by multiple tenants or other data. Such system level data might include industry reports, news, postings, and the like that are sharable among tenants.

In certain embodiments, the user systems 312 (which may be client systems) communicate with the application servers 400 to request and update system-level and tenant-level data from the system 316 that may require sending one or more queries to the tenant data storage 322 and/or the system data storage 324. The system 316 (e.g., an application server 400 in the system 316) automatically generates one or more SQL statements (e.g., one or more SQL queries) that are designed to access the desired information. The system data storage 324 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A system for confidently adding snippets of search results to clusters of objects, the apparatus comprising:
   one or more processors; and
   a non-transitory computer readable medium storing a plurality of instructions, which when executed, cause the one or more processors to:
      search for information based on objects in a cluster of objects;
      add a data snippet of unstructured data from a search result to the cluster of objects;
      calculate a confidence score for the addition of the data snippet to the cluster of objects based on at least one of a recency, a job title, an email address, and a phone number associated with the data snippet;
      determine whether the confidence score is sufficiently high for the addition of the data snippet to the cluster of objects to be stored in a customer accessible database;
      store the addition of the data snippet to the cluster of objects in the customer accessible database in response to a determination that the confidence score is sufficiently high for the addition of the data snippet to the cluster of objects to be stored in the customer accessible database; and
      generate a notice for review in response to a determination that the confidence score is not sufficiently high for the addition of the data snippet to the cluster of objects to be stored in the customer accessible database.

2. The system of claim 1, wherein the confidence score is based at least partially on how recent the unstructured data from the search result is stored in a business database, with a current date of storage equated with a relatively higher recency score.

3. The system of claim 1, wherein the confidence score is based at least partially on a job title from the search result, with a relatively higher job title in a hierarchy equated with a relatively higher title rank score, and with a job title used by a company associated with a business contact equated with a relatively higher title quality score.

4. The system of claim 1, wherein the confidence score is based at least partially on an email address from the search result, with an email score based on how well the email address matches a pattern of other email addresses for other business contacts for a company associated with a business contact and how well the email address matches a first name and a last name of the business contact.

5. The system of claim 1, wherein the confidence score is based at least partially on a phone number from the search result, where a phone number score is based on a consistency between the phone number and an area code associated with a geographic location associated with a business contact.

6. A computer program product comprising computer-readable program code to be executed by one or more processors when retrieved from a non-transitory computer-readable medium, the program code including instructions to:
   search for information based on objects in a cluster of objects;
   add a data snippet of unstructured data from a search result to the cluster of objects;
   calculate a confidence score for the addition of the data snippet to the cluster of objects based on at least one of a recency, a job title, an email address, and a phone number associated with the data snippet;
   determine whether the confidence score is sufficiently high for the addition of the data snippet to the cluster of objects to be stored in a customer accessible database;
   store the add in the customer accessible database in response to a determination that the confidence score is sufficiently high for the addition of the data snippet to the cluster of objects to be stored in the customer accessible database; and
   generate a notice for review in response to a determination that the confidence score is not sufficiently high for the addition of the data snippet to the cluster of objects to be stored in the customer accessible database.

7. The computer program product of claim 6, wherein the confidence score is based at least partially on how recent the unstructured data from the search result is stored in a business database, with a current date of storage equated with a relatively higher recency score.

8. The computer program product of claim 6, wherein the confidence score is based at least partially on a job title from the search result, with a relatively higher job title in a hierarchy equated with a relatively higher title rank score, and with a job title used by a company associated with a business contact equated with a relatively higher title quality score.

9. The computer program product of claim 6, wherein the confidence score is based at least partially on an email address from the search result, with an email score based on how well the email address matches a pattern of other email addresses for other business contacts for a company associated with a business contact and how well the email address matches a first name and a last name of the business contact.

10. The computer program product of claim 6, wherein the confidence score is based at least partially on a phone number from the search result, where a phone number score is based on a consistency between the phone number and an area code associated with a geographic location associated with a business contact.

11. A method for confidently adding snippets of search results to clusters of objects, the method comprising:
   searching for information based on objects in a cluster of objects;
   adding a data snippet unstructured data from of a search result to the cluster of objects;
   calculating a confidence score for the addition of the data snippet to the cluster of objects based on at least one of a recency, a job title, an email address, and a phone number associated with the data snippet;
   determining whether the confidence score is sufficiently high for the addition of the data snippet to the cluster of objects to be stored in a user accessible database;
   storing the add in the user accessible database in response to a determination that the confidence score is sufficiently high for the addition of the data snippet to the cluster of objects to be stored in the user accessible database; and
   generating a notice for review in response to a determination that the confidence score is not sufficiently high for the addition of the data snippet to the cluster of objects to be stored in the user accessible database.

12. The method of claim 11, wherein the confidence score is based at least partially on how recent the unstructured data from the search result is stored in a business database, with a current date of storage equated with a relatively higher recency score.

13. The method of claim 11, wherein the confidence score is based at least partially on a job title from the search result, with a relatively higher job title in a hierarchy equated with a relatively higher title rank score, and with a job title used by a company associated with a business contact equated with a relatively higher title quality score.

14. The method of claim 11, wherein the confidence score is based at least partially on an email address from the search result, with an email score based on how well the email address matches a pattern of other email addresses for other business contacts for a company associated with a business contact and how well the email address matches a first name and a last name of the business contact.

15. The method of claim 11, wherein the confidence score is based at least partially on a phone number from the search result, where a phone number score is based on a consistency between the phone number and an area code associated with a geographic location associated with a business contact.

16. A method for transmitting code for confidently adding snippets of search results to clusters of objects, the method comprising:

transmitting code to search for information based on objects in a cluster of objects;

transmitting code to add a data snippet of unstructured data from a search result to the cluster of objects;

transmitting code to calculate a confidence score for the addition of the data snippet to the cluster of objects based on at least one of a recency, a job title, an email address, and a phone number associated with the data snippet;

transmitting code to determine whether the confidence score is sufficiently high for the addition of the data snippet to the cluster of objects to be stored in a user accessible database;

transmitting code to store the addition of the data snippet to the cluster of objects in the user accessible database in response to a determination that the confidence score is sufficiently high for the add to be stored in the user accessible database; and transmitting code to generate a notice for review in response to a determination that the confidence score is not sufficiently high for the addition of the data snippet to the cluster of objects to be stored in the user accessible database.

17. The method for transmitting code of claim 16, wherein the confidence score is based at least partially on how recent the unstructured data from the search result is stored in a business database, with a current date of storage equated with a relatively higher recency score.

18. The method for transmitting code of claim 16, wherein the confidence score is based at least partially on a job title from the search result, with a relatively higher job title in a hierarchy equated with a relatively higher title rank score, and with a job title used by a company associated with a business contact equated with a relatively higher title quality score.

19. The method for transmitting code of claim 16, wherein the confidence score is based at least partially on an email address from the search result, with an email score based on how well the email address matches a pattern of other email addresses for other business contacts for a company associated with a business contact and how well the email address matches a first name and a last name of the business contact.

20. The method for transmitting code of claim 16, wherein the confidence score is based at least partially on a phone number from the search result, where a phone number score is based on a consistency between the phone number and an area code associated with a geographic location associated with a business contact.

* * * * *